(12) United States Patent
Zehnbacht et al.

(10) Patent No.: US 8,111,815 B2
(45) Date of Patent: Feb. 7, 2012

(54) METHOD AND DEVICE FOR PREVENTING MISUSE OF PERSONAL INFORMATION

(75) Inventors: Alexander Zehnbacht, Brooklyn, NY (US); Steve S. Finkelstein, Philadelphia, PA (US)

(73) Assignee: Mask.It, LLC, New York, NY (US)

( * ) Notice: Subject to any disclaimer, the term of this patent is extended or adjusted under 35 U.S.C. 154(b) by 1032 days.

(21) Appl. No.: 12/028,875

(22) Filed: Feb. 11, 2008

(65) Prior Publication Data

US 2009/0202053 A1    Aug. 13, 2009

(51) Int. Cl.
*H04M 1/64* (2006.01)
(52) U.S. Cl. .................... 379/88.22; 455/414.11
(58) Field of Classification Search ............... 455/414.1; 379/201.01, 211.02, 88.22, 218.01, 93.01
See application file for complete search history.

(56) References Cited

U.S. PATENT DOCUMENTS

| | | | |
|---|---|---|---|
| 5,361,295 A | 11/1994 | Solomon et al. | |
| 5,818,836 A | 10/1998 | Duval | |
| 5,907,602 A | 5/1999 | Peel et al. | |
| 5,907,677 A | 5/1999 | Glenn et al. | |
| 6,157,829 A * | 12/2000 | Grube et al. | 455/414.1 |
| 6,327,353 B1 * | 12/2001 | Fukuzawa et al. | 379/201.01 |
| 6,665,389 B1 * | 12/2003 | Haste, III | 379/196 |
| 6,694,003 B1 * | 2/2004 | Karam | 379/211.02 |
| 6,717,938 B1 * | 4/2004 | D'Angelo | 370/352 |
| 7,020,256 B2 * | 3/2006 | Jain et al. | 379/201.02 |
| 7,099,304 B2 | 8/2006 | Liu et al. | |
| 2004/0190707 A1 * | 9/2004 | Ljubicich | 379/218.01 |
| 2008/0037729 A1 * | 2/2008 | Mobin et al. | 379/88.17 |
| 2009/0265312 A1 | 10/2009 | Jain | |
| 2010/0128857 A1 * | 5/2010 | Logan | 379/88.22 |

OTHER PUBLICATIONS

MatchPoint FAQ, http://www.matchpoint.com/cfaq, accessed Feb. 29, 2008.
Numbr Factsheet, http://numbr.com/home/fact_sheet, accessed Jan. 17, 2008.
Jangl FAQ, http://corp.jangl.com/Faq.aspx, accessed Jan. 17, 2008.
GrandCentral, "Forwarding Phones", http://www.grandcentral.com/howitworks/forwarding_phones, accessed Jan. 17, 2008.
Craiglist, "Anonymize Your Email", http://www.craigslist.org/about/anonymize.html, accessed Jan. 17, 2008.
CallSafe, "How it Works", http://www.call-safe.com/howitworks.htm, accessed Jan. 17, 2008.

* cited by examiner

*Primary Examiner* — Curtis Kuntz
*Assistant Examiner* — Maria El-Zoobi
(74) *Attorney, Agent, or Firm* — Michael J. Feigin, Esq.; http://PatentLawNY.com

(57) ABSTRACT

The invention disclosed comprises a method and device for receiving an order request from a first party along with contact information for the first party, routing at least some communication made using, or to, second contact information, such as may be provided to the first party, and providing at least part of the order request and first contact information to a third party. The contact information may be a phone number or an e-mail address or a plurality of same.

37 Claims, 9 Drawing Sheets

Your full NAME: ◻ ◻ ← 710
Your valid EMAIL: ◻ *
Phone numbers (Only one required):* ← 720
Valid HOME Phone: ◻
Valid WORK Phone: ◻ EXT. ◻ ← 730
Estimated move SIZE: -- Select Move Size -- ▼ *

☑ Anonymize my email address and phone numbers (?) (SPAM) (⊘) 740

750 COMMENTS:
◻

GET FREE QUOTES ▶
760

Figure 7

| | |
|---|---|
| Move Details: | |
| Move Date: | 12/28/2007 |
| Moving From: | Fremont, CA 94555 |
| Moving To: | San Francisco, CA |
| Move Size: | 2 Bedrooms |
| Contact Information: | |
| Customer Name: | Mirasol Panlilio |
| Home Phone: | (347) 239-5709  x7630842 |
| Work Phone: | (347) 239-5709  x9374550 |
| Work Phone Ext.: | 4 |
| Cell Phone: | (347) 239-5709  x4309782 |
| Email: | anon-45kr32sd13e3r4@formanonymizer.com |
| Best Time to Call: | Any time |
| Comments: | must be morning of Dec 28 Friday from 8-12 |

METHOD AND DEVICE FOR PREVENTING MISUSE OF PERSONAL INFORMATION

BACKGROUND OF THE INVENTION

Identity theft and misuse of personal information are major concerns amongst consumers and often serve as deterrents to commerce because consumers are reluctant to reveal their personal information. It is known that companies often resell phone numbers, e-mail addresses, and street addresses without authorization. Once this information becomes public knowledge, and especially if it is associated with a consumer who has, for example, purchased a certain product in the past or fallen victim to a scam, this information could also be used to target the consumer.

The consumer fear of misuse of data is especially prevalent when commerce is not face to face, such as when a transaction is conducted in whole or in part online or over the telephone. While certain websites and catalogs may have privacy policies, a consumer never knows when his or her information will be sold or misused.

While "do not call" lists are published at least by the U.S. government concerning telemarketing calls made to individuals who have opted out, unfortunately unwanted calls may still be received which are not covered by the policies of the "do not call" lists or the government policy may not suffice. For example, once a consumer conducts a transaction with a business, that business may again call the consumer even if the consumer does not wish to receive such a call. Furthermore, other callers are exempt from the requirements of the "do not call" lists and, for the time being, there is no comparable "do not call" list aimed at preventing the receipt of unwanted e-mail or regular mail.

Still further, even when a call, e-mail, or other communication is from a "legitimate" source, and even with anonymized contact information, there is no deterrent against abuse of the customer's contact information or anonymized contact information. For example, a business or telemarketer may not be the party the consumer believes it to be. In addition, a business or telemarketer may e-mail or call several times, pretending to be a different entity each time, or send spam (unwanted e-mail) to the customer.

One prior art solution is to provide a temporary phone number or e-mail address. However, these too can be utilized in unwanted manners, and, unless there is a large pattern of misuse across many e-mail addresses or phone numbers, it is difficult to track misuse.

In some cases, a consumer may desire that his contact or other information about his needs be sent to a third party. However, in such a case, in the prior art, there is no easy way to track whether the needs of the consumer have been met by the third party and to stop the information from being forwarded.

What is needed in the art is a method for allowing users to be contacted by merchants or others in a commerce setting, whereby the transaction can take place without fear that consumer contact information will be disclosed to an unwanted party. There is further a long-felt and unsolved need to provide an easy method or device to monitor usage of consumer contact information in order to prevent misuse and track desired use.

SUMMARY OF THE INVENTION

It is therefore an object of the invention to provide a method and device to allow contact information for a party to be anonymized when provided with an order request.

It is a further object of the invention to provide a simple method of tracking abuse of consumer information.

It is a further object of the invention to spare consumers the receipt of unwanted contact and/or the sale of their contact information and personal information.

It is yet another object of the invention to provide a method and device to track business leads.

The method of the invention generally proceeds by receiving an order request from a first party, such as a consumer, along with a phone number or e-mail address, while providing a second phone number or e-mail address to at least one third party. When the third-party calls or e-mails the second phone number or e-mail address, the e-mail or phone call is routed to the first party's e-mail address or phone number. Thus, at least the second party can track e-mails and calls made by third parties to consumers who submit information to them and detect misuse. Other contact information may also be used in embodiments of the invention.

More specifically, a method of the invention comprises receiving an order request and a phone number from a first party, configuring a second phone number to route at least some incoming calls made to the second phone number to the received phone number, and providing information comprising at least a part of said order request and the second phone number to at least one third party.

The second phone number (or devices associated with the second phone number) may be configured to exclude from routing incoming calls originating from a party other than the at least one third party and the at least one third party may be one third party. The one, or at least one, third party may be designated, chosen, or selected by the first party.

The method may further comprise a step of recording a log of phone calls made to the second phone number. The log may be used to detect unauthorized usage of at least a part of the provided information, such as the phone number or order request provided by the first party. The method may further comprise removing the route (i.e., the call forwarding) upon fulfillment of an order requested by the first party.

The above method may also comprise receiving an e-mail address from the first party and a further step of configuring a second e-mail address to forward at least some incoming e-mails to the first party's e-mail address, and providing the second e-mail address to at least one third party.

Another method of the invention comprises receiving an order request and contact information from a first party, providing second contact information for the first party, configuring at least some communication made using the second contact information to route to the first party, and providing information comprising at least a part of the order request and the second contact information to at least one third party, and removing said route (i.e., e-mail or phone number forwarding) upon fulfillment of the order requested by the first party.

In embodiments of the invention, the communication reaches the first party substantially in real-time. The contact information may be a phone number, e-mail address, or other information used to contact the first party. The first party may know in advance which third party will receive the second contact information, and the routing (or forwarding) may take place only when the proper third party (or third parties) initiates the communication.

The method may further comprise a step of recording a log of communication made using the second contact information and using the log to detect unauthorized usage of at least a part of the provided information.

One or more devices of the invention may be configured to carry out the steps of the method of the invention. A device in embodiments of the invention is configured to receive an order request and a phone number from a first party cause at least some calls made to a second phone number to be routed to the received phone number, and provide or exhibit information comprising at least a part of the order request and second phone number to at least one third party.

The device may route, or cause to be routed, calls directed towards the second phone number to the received phone number only when the calls are received from the at least one third party who was provided with the second number.

The device of the invention may be configured to provide an alert when a call originates from a party other than the at least one third party. The device may remove the route (i.e., forwarding) upon fulfillment of the order requested by the first party.

The receiving may further comprise receiving an e-mail address, and the device may further be configured to forward at least some incoming e-mails directed towards a second e-mail address, to the received e-mail address, and the second e-mail address may be provided to the at least one third party.

In another embodiment of the invention (which may overlap with the previous device), a device is configured to receive an order request and contact information from a first party, provide second contact information for the first party, forward at least some communication made using the second contact information to the first party, and provide information comprising at least a part of the order request and the second contact information to at least one third party.

The contact information may be a phone number or e-mail address. The communication may only be routed when received from the at least one third party. The at least one third party may be one third party, and the third party may be designated by the first party or the second party. An alert may be provided when a communication originates from a party other than the at least one third party, and the route may be removed upon fulfillment of the order requested by the first party.

BRIEF DESCRIPTION OF THE DRAWINGS

FIG. 7 shows a form that may be used by a first party to send an order request and contact information to a second party in embodiments of the invention.

FIG. 8 shows an example of anonymized contact information and an order request sent to a third party.

FIG. 9A shows an example of a display of configuration options and call information in an embodiment of the invention.

FIG. 9B shows an example of a display representative of communications received by a first party from a third party.

DETAILED DESCRIPTION

Figure 1:
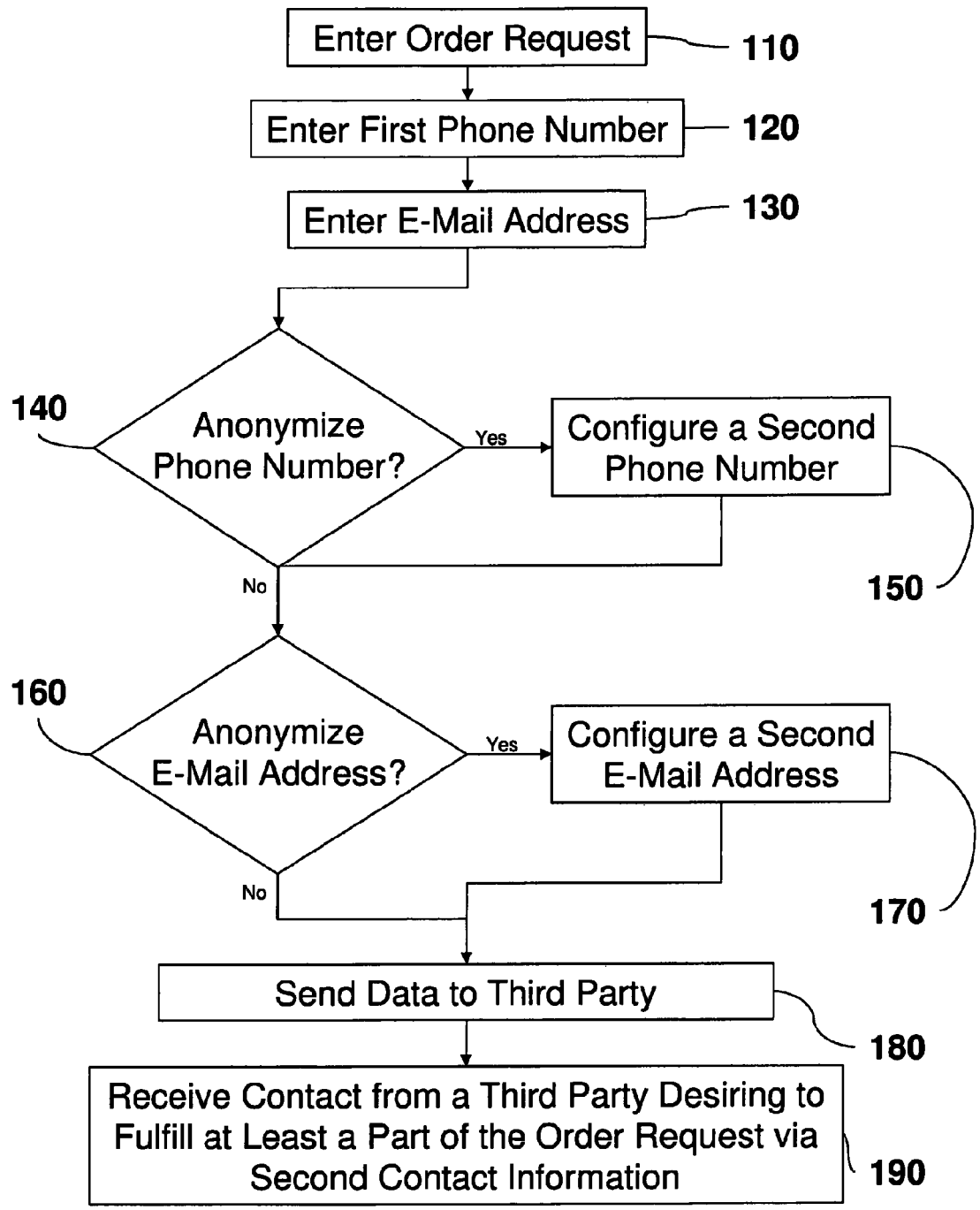
FIG. 1 shows an overview of a method of carrying out embodiments of the invention from a first party perspective.

The invention disclosed comprises a method and device for receiving an order request from a first party, along with contact information for the first party, routing at least some communication made using, or to, second contact information, such as may be provided to the first party, and providing at least part of the order request and first contact information to a third party.

The term "receiving," in the context of the claim language, means either receiving (i.e., accepting data or information) or causing to be received (i.e., filling out a form and sending data or information to another). Similarly, the term "providing," in the context of the claim language, means either providing or causing to be provided. Still further, the term "routing," in the context of the claim language, means either the actual routing of information or data, such as a phone number or e-mail address, from one destination (whether real or virtual) to another, or causing data or information to be routed. Data or information may be caused to be routed if a device or a person carrying out a step of the method of the invention instructs a device to route received communication. Such a person carrying out this step of the method of the invention may be the first party submitting data which causes a device—such as a server—to set up routing of telephone calls or email.

The first party is a consumer, person, or entity seeking to purchase a service or product or conduct business with another person or entity. The order request is a request filled out or sent by the first party to a second party, comprising a request for such a service, product, or offer to conduct business with another person or entity. The request may comprise multiple requests, may be a request for a bid, a bid, and/or a request or offer for a service to be carried out at a specific time or in a specific manner. The contact information is data which may be used by another party to contact the first party either directly or indirectly. The contact information may comprise a telephone number, an e-mail address, a physical address, an instant messenger screen name/user ID, URL, and the like. Still further, a plurality of contact information may be provided, such as home and work telephone numbers, a home telephone number and e-mail address, and the like.

The second party is a party receiving an order request and contact information from the first party. The second party may also generate or cause to be generated second contact information (also referred to as "anonymous contact information") and forward or cause to be forwarded communications to the first party which were directed at the second contact information. The second party may be a device, a person, or an entity consisting of devices and people, such as one or more companies and computer systems at the company or companies. The third party is a person, device, or entity which desires to carry out at least part of an order requested in an order request.

Embodiments of the invention will become clearer in light of the figures which are described herein below.

FIG. 1 shows an overview of a method of carrying out embodiments of the invention from a first party perspective. In step 110, a first party enters an order request. Entry may proceed by any method known in the art, such as via a web form, printed form, or by telling a second party. In step 120, the first party enters at least a first phone number. The first phone number may be any phone number as conventionally known in the art and may include the entering of an extension. Still further, step 120 may comprise the entry of multiple phone numbers, and the first phone number may be a plurality of phone numbers entered by the first party where the first party wants calls to be received. In step 130, an email address is entered.

In step 140, the first party chooses whether to anonymize his or her phone number, i.e., create or cause to be created a forward or route of at least some calls directed to a second phone number to the first phone number that he or she provided. If the first party chooses to anonymize his or her phone number, then, in step 150, a second phone number is configured or caused to be configured by the first party. The second phone number is configured in step 150 such that at least some phone calls received at the second phone number or via the second contact information will forward to the first phone number or first contact information. If the first party chooses not to anonymize the first phone number, then step 160 is carried out.

Similar to step 140, in step 160, the first party chooses whether to anonymize his or her email address. If the first party chooses to do so, then similar to step 150, step 170 is carried out, whereby a second email address is configured or caused to be configured by the first party. If the first party does not choose to do so, then a second email address will not be configured and the invention proceeds directly to step 180.

In step 180, data are sent to a third party. This is accomplished by the first party sending data to a second party, which, in turn, sends at least some of these data to the third party, or by the first party sending the second contact information directly to a third party. The data will include at least a part of the order request entered in step 110 and at least enough information to contact the first party. Finally, in step 190, the first party receives contact from the third party desiring to fulfill at least a part of the order request via second contact information, such as the configured second phone number or second e-mail address.

It should be understood by one skilled in the art that any contact information may be entered whether existing at the time of filing of this invention or due to exist in the future. It should further be understood that the steps of the invention as shown in FIG. 1 can be carried out in any reasonable order and that, in practice, it is not necessary for every step of the invention to be carried out. For example, steps 150 and 170, the steps directed towards configuration of second contact information, may be carried out after or just before data is sent to a third party in step 180. Further, steps 160 and 170 may be skipped entirely in embodiments of the invention where a phone number is being anonymized. In addition, the data sent to the third party may vary in embodiments of the invention. In one embodiment, part of an order request, such as a request for a bid that does not include some data, is sent to a third party but some data are held back by the second party. In another embodiment, an entire order request is sent. In yet another embodiment, the method (or device) of the invention proceeds by anonymizing all phone numbers, email addresses, and/or other contact information received from first parties, and may or may not give the first party a choice to anonymize or supply other contact information. Still further and as explained above, "configure" means that the first party configures or sends data or instructs another party to configure a second phone number or e-mail address. The data sent to a third party in embodiments of the invention are by way of a second party as defined above.

Figure 2:
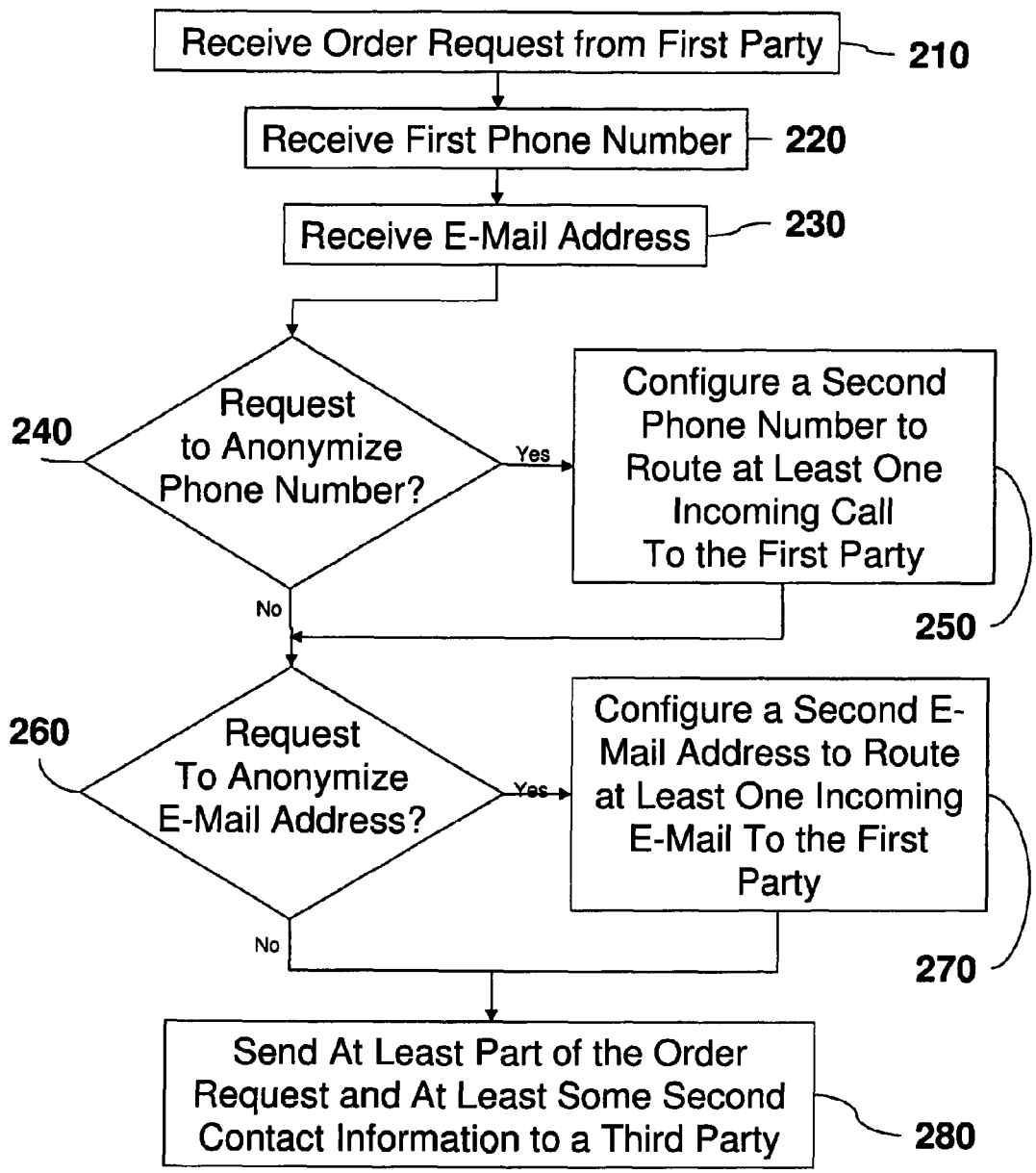
FIG. 2 shows an overview of a method of carrying out embodiments of the invention from a second party perspective.

FIG. 2 shows an overview of a method of carrying out embodiments of the invention from a second party perspective. The steps performed by a first party in embodiments described with reference to FIG. 1 have been incremented by 100 when performed by a second party in embodiments described with reference to FIG. 2. However, the claimed language refers to either the actions of a first party or a second party, i.e., "receiving," "causing to be received," and "sending" are all defined as being within the claim comprising a step of "receiving."

The second party receives an order request from a first party in step 210, a first phone number in step 220, and an e-mail address in step 230. Then, in step 240, if the first party has requested to anonymize his or her phone number, or alternatively, if the second party decides, or is configured, to anonymize the phone number, in step 250 a second phone number is configured to route at least one incoming call to the first party. If the first phone number is not to be anonymized, then the method proceeds directly to step 260, whereby the process is repeated with an e-mail address in steps 260 and 270. In step 280, at least part of the order request and at least some of the second contact information, such as the second phone number or e-mail address, are sent to a third party. Alternative embodiments of the invention described with reference to FIG. 1 are also applicable to the methods disclosed with reference to FIG. 2.

Figure 3:
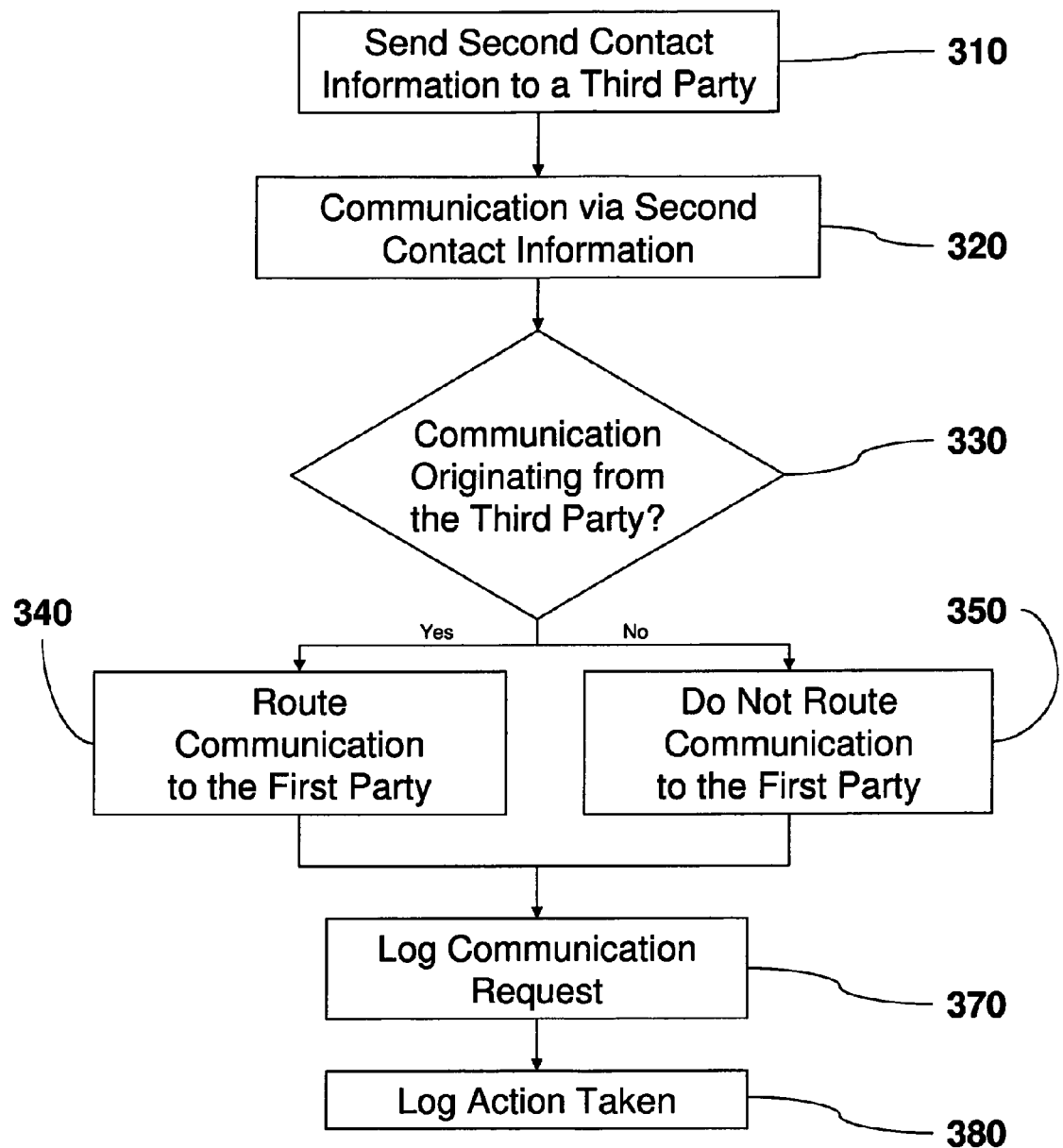
FIG. 3 shows an overview of a method of deciding whether to route incoming calls to the first party in embodiments of the invention.

FIG. 3 shows an overview of a method of deciding whether to route incoming calls to the first party in embodiments of the invention. In the method depicted in FIG. 3, phone calls, e-mails, or other communications directed to provided second contact information (such as a second phone number or e-mail address) are routed depending upon where the communications were initiated. In step 310, second contact information (of a first party) is sent to a third party. In embodiments of the invention, step 310 is skipped, irrelevant, or not party of the method. In step 320, communication via second contact information (or anonymized contact information) is received. The receipt of the communication may be a receipt of an attempt to communicate and is received by a server, switchboard, device, or person other than the first party. For example, a third party or another party makes a phone call or sends an e-mail to the second phone number or second e-mail address.

In step 330, it is ascertained whether the communication via the second contact information originated from the third party. This may be verified by reviewing e-mail header information, caller ID information, route between the sender and recipient, or other methods known in the art. The third party, in embodiments of the invention, is the party receiving the order request or who was informed of the second contact information by either the first party or second party. If the communication originated from the third party, then in step 340, the communication is routed to the first party, such as to an e-mail address, phone number, or voicemail of the first party. If the communication does not originate from the third party, then in step 350, the communication is not routed to, or is routed away from, the first party, such as by bouncing the e-mail with a temporary or permanent error code, providing a busy signal, or the like.

Steps 370 and 380 are carried out in some embodiments of the invention. In steps 370, the communication request via the second contact information is logged, such as by writing a record of information about the communication to a data file or database for further analysis. Information logged may include time of communication, information about the sender, and contents of the communication. Alternatively, mechanisms for protecting privacy and preventing the logging of the communication itself may be put into place by having the logging conducted by, for example, the second party and the content of the communication routed in such as manner as not to pass through the second party.

Figure 4:
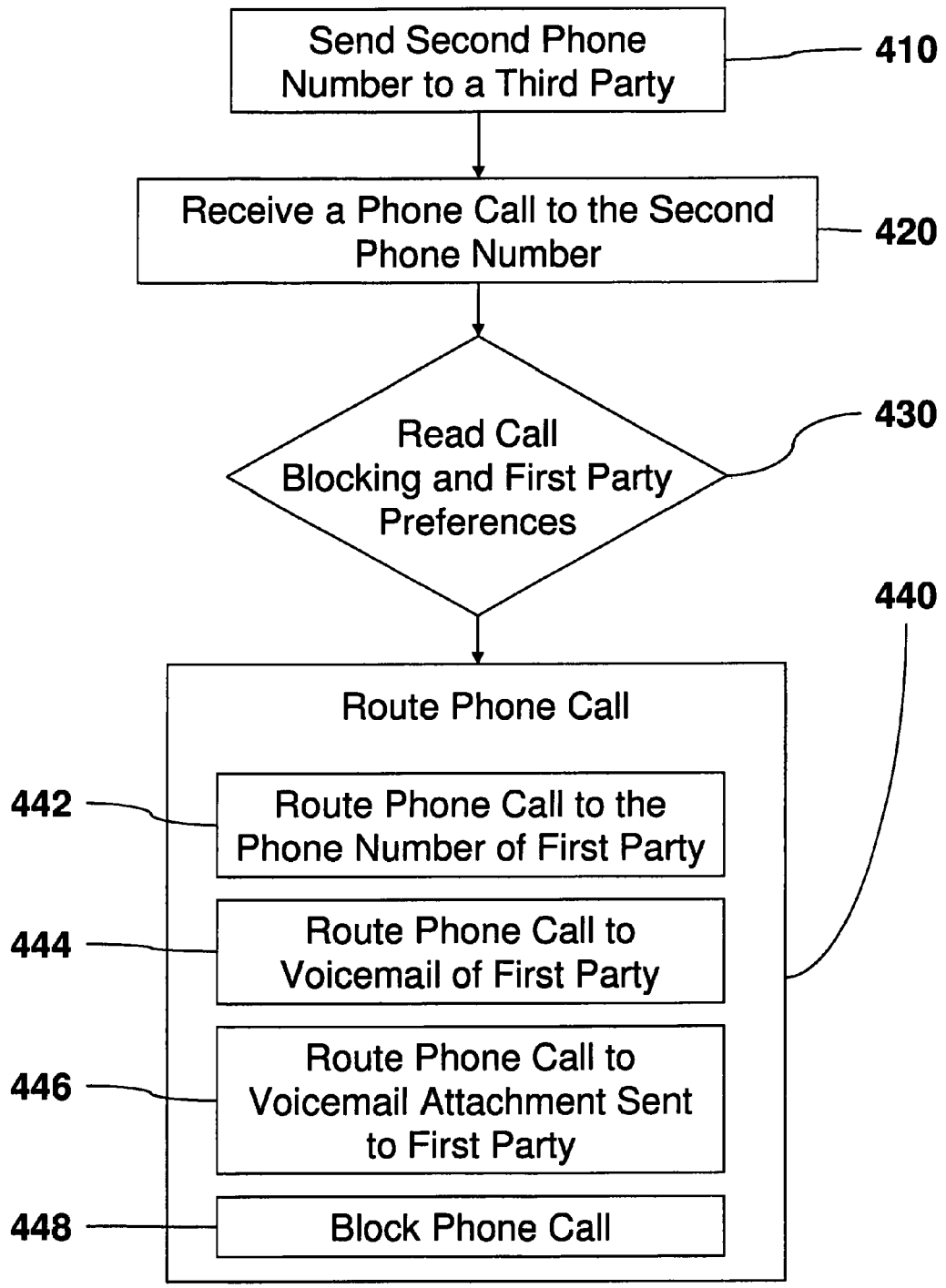
FIG. 4 shows an overview of a method of routing a received telephone call to a first party in embodiments of the invention.

FIG. 4 shows an overview of a method of routing a received telephone call to a first party in embodiments of the invention. Similar to step 310 and as described above, in step 410 a second phone number is sent to a third party. In some embodiments of the invention, step 410 is not carried out. In step 420, a phone call is received at the second phone number. In step 430, call blocking information is read or otherwise utilized to determine if either the first or the second party has configured (including causing to be configured) a phone number to be blocked, such as is described with reference to FIG. 3, or blocked for other reasons, such as blocking a known telemarketer or based on other preferences. Based on the preferences of the first party, in step 440, the phone call is routed.

Some ways in which the phone call may be routed include routing the call to the phone number provided by the first party (step 442), routing the phone call to voicemail of the first party (step 444), routing the phone call to a voicemail attachment sent to the first party (step 446), or by blocking the phone call (step 448). The voicemail may be compressed or stored by any method known in the art, such as in a WAV or MP3 file. The first or second party may configure routing of some phone calls to one of the routes 442, 444, 446, or 448, and other phone calls to another route. The first party may choose which third parties should receive his contact information, and the choice may be a selection of an individual third party (or individual third party entity) such as a person or a company, or it may be a selection of a specific type of merchant or service provider, for example movers or accountants.

Figure 5:
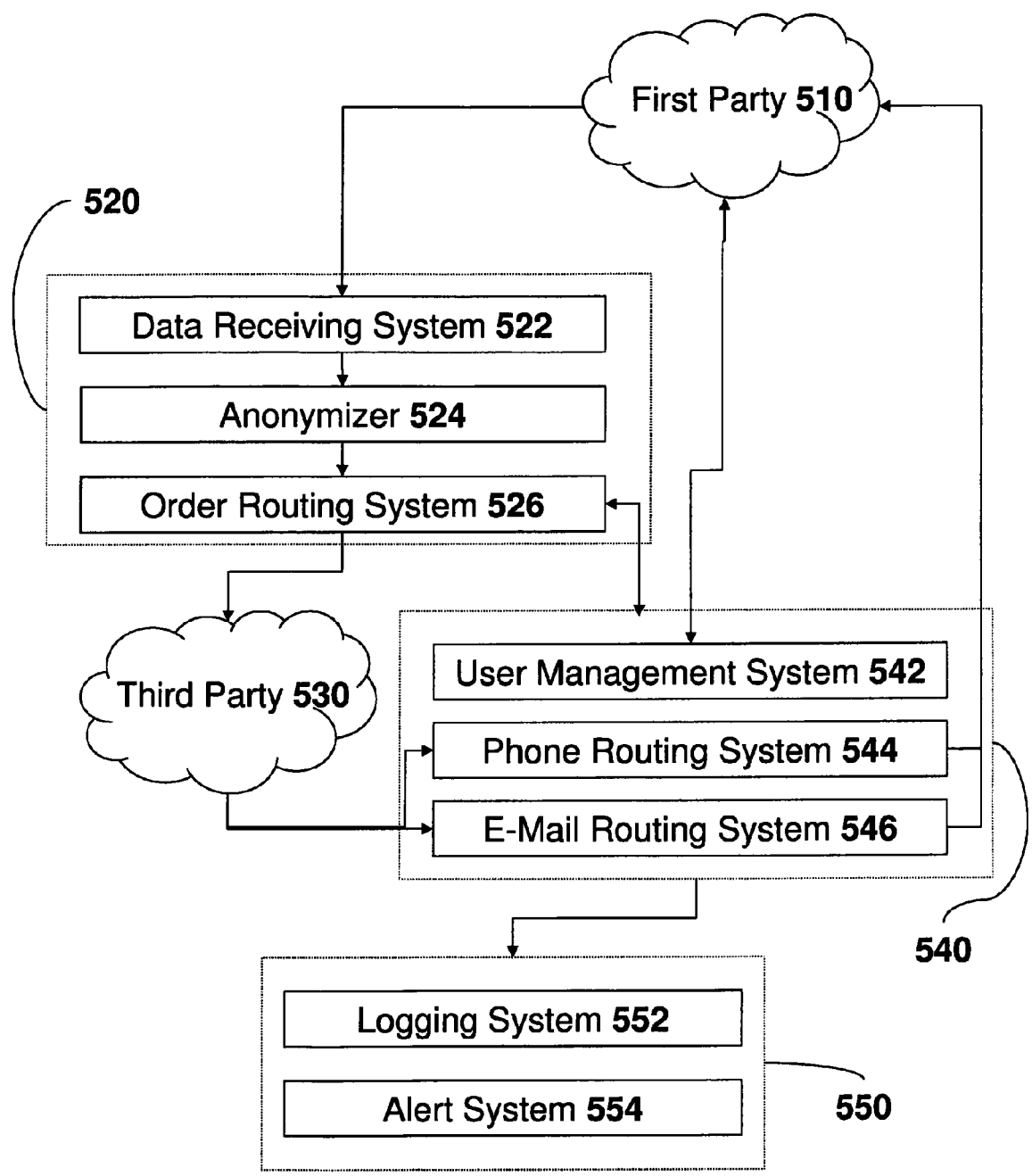
FIG. 5 shows a high level block diagram of a device that may be used to carry out the invention.

FIG. 5 shows a high level block diagram of a device that may be used to carry out the invention. It should be noted that first party 510, second party 520, and third party 530 have been defined above and refer to a person, an entity, a device, or pluralities or combinations of people, entities, and/or devices, each carrying out the same or different functions as any other. First party 510 sends or causes to be received data such as an order request and his or her contact information to a second party 520 and, more specifically, to a data receiving system such as a web server. At least the data which are to be anonymized are passed through an anonymizer 524, which provides or instructs an order routing system 526 to provide second contact information configured to forward or route at least some received communication to the first party.

The order routing system 526 routes the data received from the data receiving system 522 (either directly or via anonymizer 524) to a control center 540. The control center 540 may also be, at least in part, the second party, a phone company or phone switch, a server, or the like. The order routing system 526 also routes at least a part of an order request received from first party 510 and contact information which may have been anonymized by anonymizer 524 to at least one third party 530.

Describing the control center 540 in more detail, the control center comprises a user management system 542. In embodiments of the invention, the user management system is configured to allow a user to control routing preferences, enabling and disabling of second contact information, hearing voicemail, and so forth. The user management system 542 may allow a first party 510 to directly or indirectly configure the phone routing system 544 and e-mail routing system 546. The phone routing system 544 and e-mail routing system 546 may each be separate devices from the user management system 542 and from each other. The e-mail routing system 546 may be a mail server, and the phone routing system 544 may be a telephone switch. When a third party 530 sends an e-mail or telephone call, the respective routing system is accessed to determine how the call or e-mail should be routed, as described with regard to the method of the invention. If the call or e-mail is to be sent to the first party 510 via the provided or known contact information, then it is routed as such. It should also be understood by one skilled in the art that, when another method of contact is used, a further routing system may be necessary. For instance, when routing instant messages via second contact information, an IM routing or forwarding system may be used.

The control center 540 may also communicate (exchange data with) an interface 550 comprising a logging system 552 and/or alert system 554. The logging system 552 logs information about calls, e-mails, or other communications. The alert system 554 may be used to signal a first party 510, second party 520, or other party that there has been an unauthorized communication or attempt, and a party may decide to take further action to limit or discourage such unauthorized communication or attempt. Methods of limiting/discouraging include contacting the offending party, exiting a contract with the offending party, seeking litigation, notifying a government authority such as a federal trade commission (for violations of trade, including the "do not call" list) and so forth.

Figure 6:
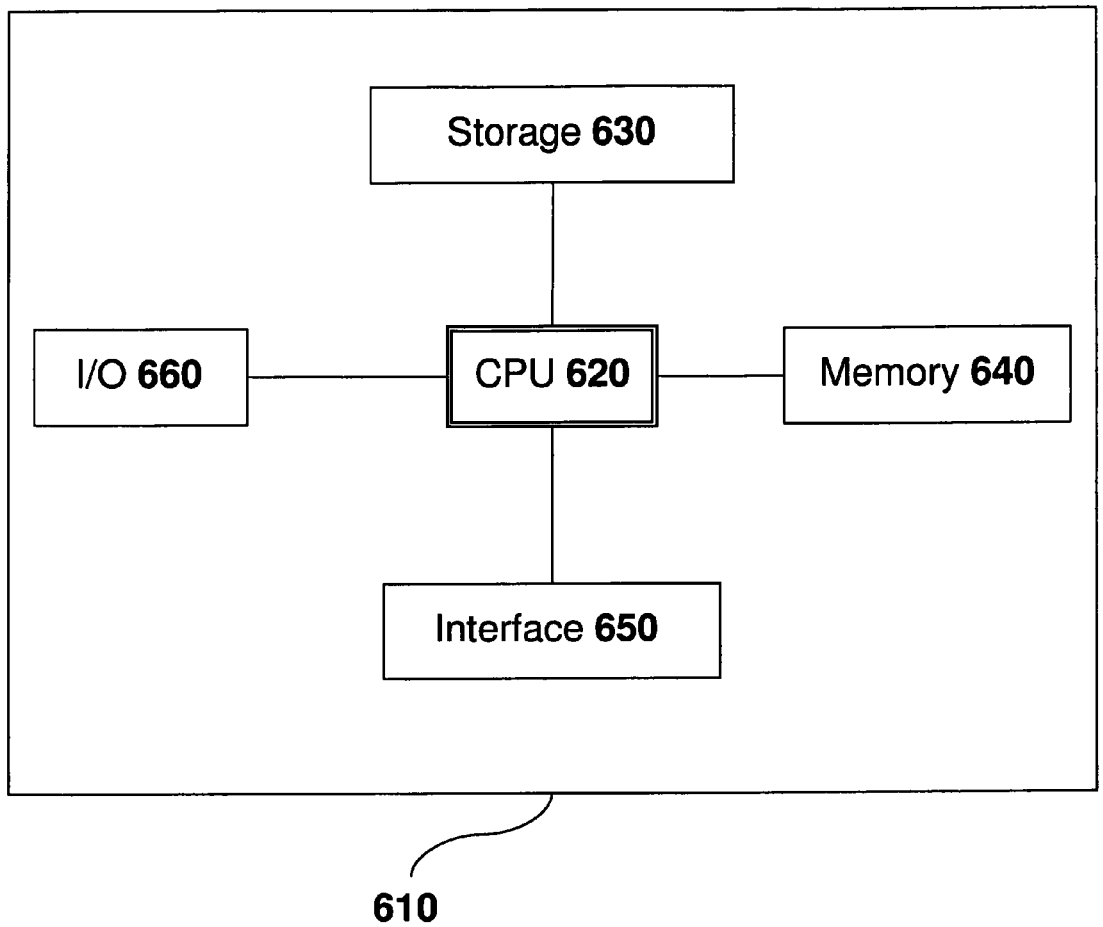
FIG. 6 shows a second high level block diagram of a device that may be used to carry out the invention.

FIG. 6 shows a high-level block diagram of a device that may be used to carry out the invention. The device 610 comprises a CPU (processor) 620 that controls the overall operation of the computer by executing computer program instructions which define such operation. The computer program instructions may be stored on a storage device 630 (e.g., magnetic disk, database) and loaded into memory 640 when execution of the computer program instructions is desired. The storage device 630 may be used in embodiments of the invention to store information related to a plurality of product data, as well as ratings, reviews, algorithms, and so forth. Thus, the computer operation will be defined by computer program instructions stored in memory 640 and/or storage 630, and the computer will be controlled by CPU 620 executing the computer program instructions. Device 610 may also comprise one interface 660, or a plurality of input or output interfaces 660, such as network interfaces for communicating with other devices via a network (e.g., the Internet), and an input/output 660 representing device which allows for user interaction with the device 610 (e.g., display, keyboard, mouse, speakers, buttons, etc.). Calculations used in the method of the invention may be carried out on such a device. One skilled in the art will recognize that an implementation of an actual computer will contain other components as well, such as a distributed device or network device wherein the components reside on separate computing devices, and that FIG. 6 is a high level representation of some of the components of such a computer for illustrative purposes. It should also be understood by one skilled in the art that the method and devices depicted in the previous figures may be implemented on a device such as is shown in FIG. 6.

FIG. 7 shows a form that may be used by a first party to send an order request and contact information to a second party in embodiments of the invention. The form, by way of example and not limitation, shows a name field 710 for entry of the name of a first party, an email field 720 for entry of an email address of the first party, and home and work phone number fields 730 for entry of at least one phone number of a first party. As can be seen in the figure, entry of a phone number in phone number field 730 may comprise entry of a phone number extension. In embodiments of the invention, the extension is also anonymized. In other embodiments of the invention, the phone number is anonymized, but the extension is not and is provided to a third party. When the extension is anonymized, a third party calling the anonymized (second) phone number may enter a different extension, or may enter no extension when the second phone number is configured to ring the first party at the provided extension.

Order request 740, in the embodiment depicted in FIG. 7, is where the first party enters information about his or her order. In this particular case, the order request 740 is a request for an estimated move size and comments. As described above, some or all of the order requested may be sent to a third party and, for example, in this embodiment, may include the estimated move size, comments, or both.

Anonymization check box 750 provides the first party with an indication of whether or not to anonymize his or her e-mail address and phone number. As described above, in other embodiments of the invention, the decision may be made by a second party, may be predefined by a second party, or may allow for a selection by the first party to anonymize only an e-mail address or phone number. Finally, submit button 760 allows a user to send his or her order request and contact information to a second party.

FIG. 8 shows an example of anonymized contact information and an order request sent to a third party. It should be noted that, in this example, the anonymized phone numbers provided include extensions to be dialed by the third party. Thus, in embodiments of the invention, the third party knows that he or she is receiving anonymized information. In other embodiments of the invention, the third party does not know that he or she is receiving anonymized information.

Figures 9A, 9B:
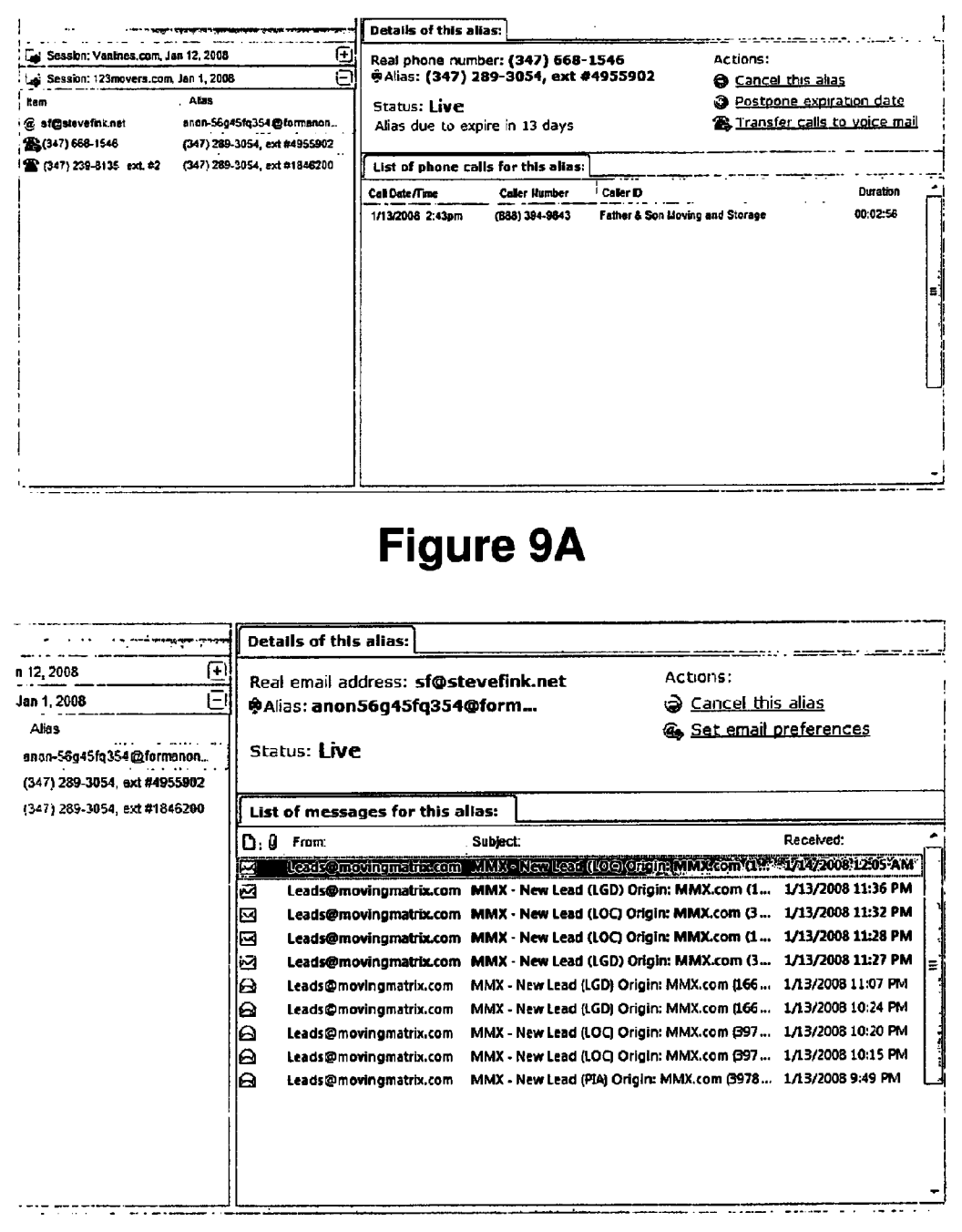

FIG. 9A shows an example of a display of configuration options and call information in an embodiment of the invention. This may be a screen displayed to a first party or second party in embodiments of the invention.

FIG. 9B shows an example of a display representative of communications received by a first party from a third party. The display may comprise e-mails, phone calls, voicemail, or other contact, or attempts at contact, with the first party. The contacts and/or attempts at contact may be logged by the second party or kept on a server of the second party for viewing and/or retrieval by the first or second party.

While the invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope.

We claim:

1. A method for preventing misuse of personal information comprising the steps of:
   receiving an order request and a first phone number from a first party;
   routing a telephone call made to a second phone number to said first party;
   providing information comprising at least a part of said order request and said second phone number to at least one third party
   recording a log of phone calls made to said second phone number; and
   using said log to detect unauthorized usage of at least a part of said provided information.

2. The method of claim 1, wherein said routing is limited to telephone calls originating from said at least one third party.

3. The method of claim 1, wherein said routing is to said first phone number.

4. The method of claim 1, wherein said routing is to voicemail.

5. The method of claim 4, wherein said voicemail is sent to said first party as an e-mail attachment.

6. The method of claim 1, wherein said first party is provided with a method of selecting a delivery method of said telephone call.

7. The method of claim 6, wherein said first party is provided with a method to discontinue said routing.

8. The method of claim 1, wherein said method further comprises: receiving a first e-mail address from said first party,
   providing a second e-mail address to at least one third party, and
   configuring at least one e-mail sent to said second e-mail address to route to said first party.

9. A method for preventing misuse of personal information comprising the steps of:
   receiving an order request contact information, and an optionally
   selected request to anonymize at least a part of said contact information from a first party;
   providing second contact information for said first party;
   routing at least some communication made using said second contact information to said first party;
   providing information comprising at least a part of said order request and said second contact information to at least one third party;
   recording a log of phone calls made to said second phone number;
   and using said log to detect unauthorized usage of at least a part of said provided information.

10. The method of claim 9, wherein said contact information is a phone number.

11. The method of claim 9, wherein said contact information is an e-mail address.

12. The method of claim 9, wherein said at least one third party is selected by said second party.

13. The method of claim 9, wherein said routing is limited to communications originating from said at least one third party.

14. The method of claim 9, wherein said routing is via a phone number of said first party.

15. The method of claim 14, wherein said routing is to voicemail.

16. The method of claim 15, wherein said voicemail is sent to said first party as an e-mail attachment.

17. The method of claim 9, wherein said first party is provided with a method of selecting a delivery method of at least one said communication.

18. The method of claim 17, wherein said first party is provided with a method to discontinue said routing.

19. A device for preventing misuse of personal information configured to
   receive an order request and a phone number from a first party;
   route a telephone call made to a second phone number to said first party;
   provide information comprising at least a part of said order request and said second phone number to at least one third party; and
   provide an alert when a party other than said at least one third party attempts to communicate using said second contact information.

20. The device of claim 19, wherein said route is limited to telephone calls originating from said at least one third party.

21. The device of claim 19, wherein said route is to said first phone number.

22. The device of claim 19, wherein said route is to voicemail.

23. The device of claim 22, wherein said voicemail is sent to said first party as an e-mail attachment.

24. The device of claim 19, wherein said first party is provided with a method of selecting a delivery method of said telephone call.

25. The device of claim 24, wherein said first party is provided with a method to discontinue said routing.

26. The device of claim 19, further configured to provide an alert when a party other than said at least one third party calls said second telephone number.

27. The device of claim 19, wherein said receiving further comprises receiving a first e-mail address from said first party, and said device is further configured to route at least one e-mail directed towards a second e-mail address to said first e-mail address, and said second e-mail address is provided to said at least one third party.

28. A device for preventing misuse of personal information configured to: receiving an order request, and contact information, and an optionally
   selected request to anonymize at least a part of said contact information from a first party;
   provide second contact information for said first party;
   forward at least some communication made using said second contact information to said first party;
   provide information comprising at least a part of said order request and said second contact information to at least one third party; and
   provide an alert when a party other than said at least one third party attempts to communicate using said second contact information.

29. The device of claim 28, wherein said contact information is a phone number.

30. The device of claim 28, wherein said contact information is an e-mail address.

31. The method of claim 28, wherein said at least one third party is selected by said second party.

32. The device of claim 28, wherein said routing is limited to communication originating from said at least one third party.

33. The device of claim 28, wherein said routing is via a phone number of said first party.

34. The device of claim 33, wherein said routing is to voicemail.

35. The device of claim 34, wherein said voicemail is sent to said first party as an e-mail attachment.

36. The device of claim 28, wherein said first party is provided with a method of selecting a delivery method of said at least some communication.

37. The device of claim 36, wherein said first party is provided with a method to discontinue said routing.

* * * * *